Dec. 13, 1938. E. E. BUSKIRK 2,140,280
DENTAL FORCEPS
Filed June 24, 1937 3 Sheets-Sheet 1
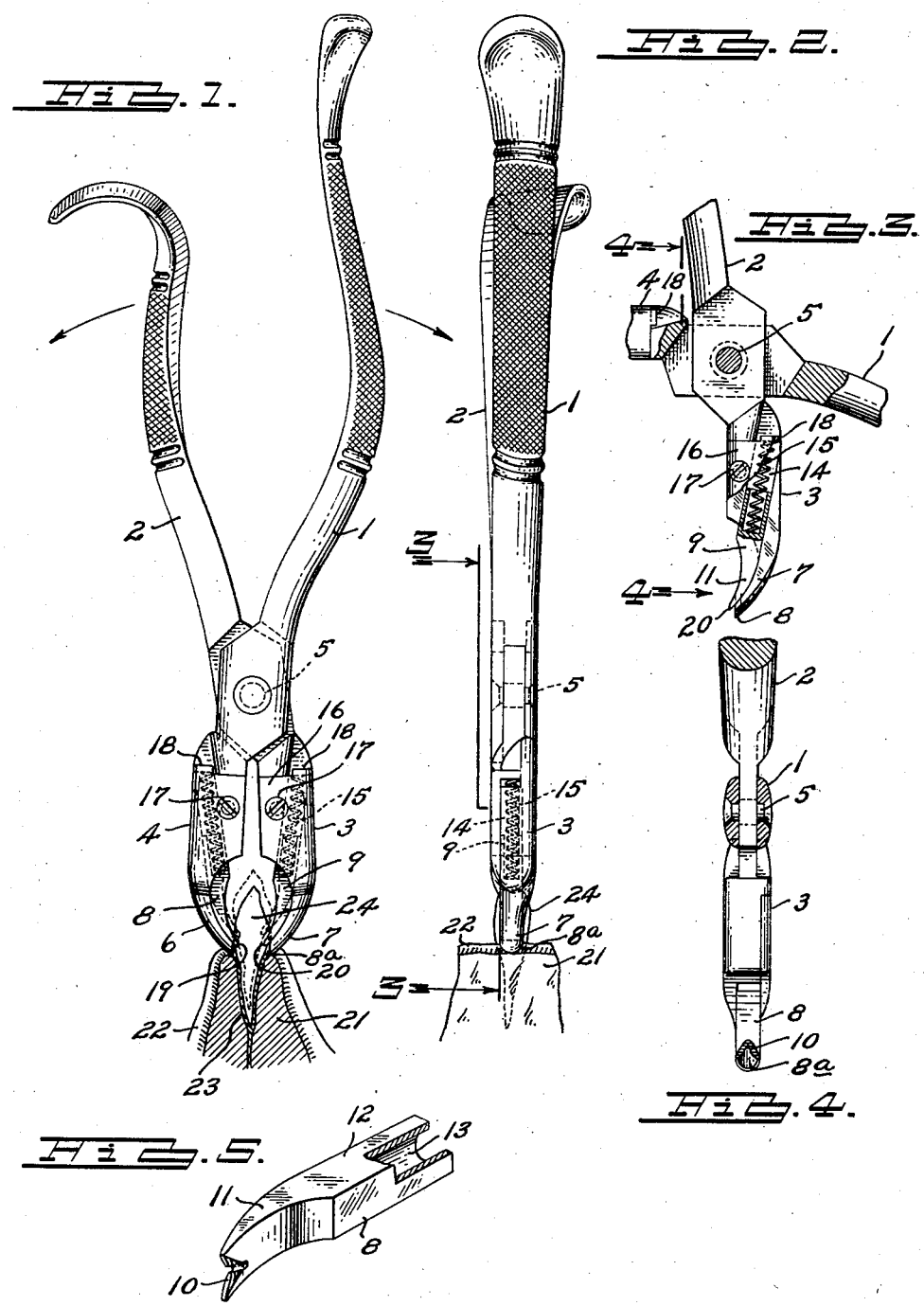
INVENTOR.
Elmore E. Buskirk
BY
ATTORNEY.

Dec. 13, 1938.  E. E. BUSKIRK  2,140,280
DENTAL FORCEPS
Filed June 24, 1937   3 Sheets-Sheet 2
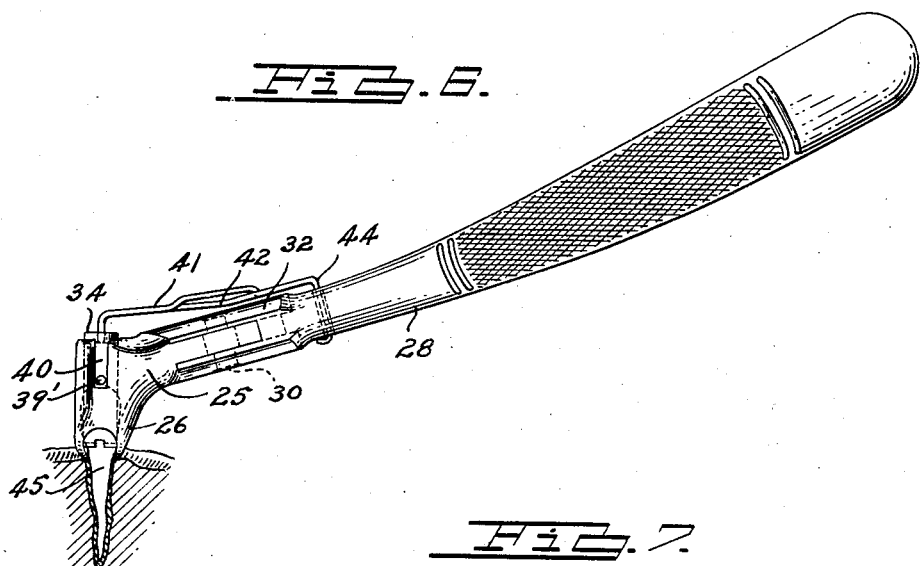
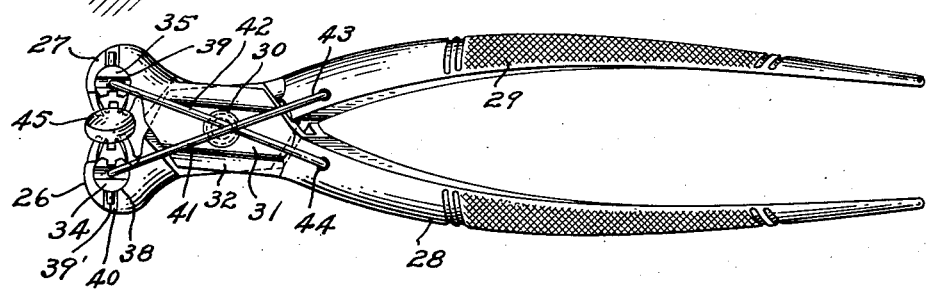
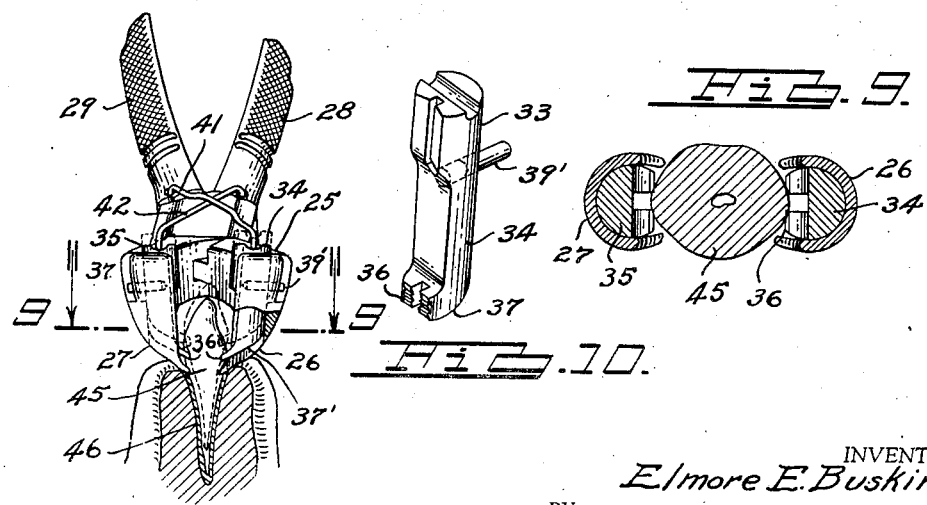
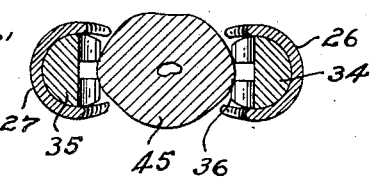
INVENTOR.
Elmore E. Buskirk
BY
ATTORNEY.

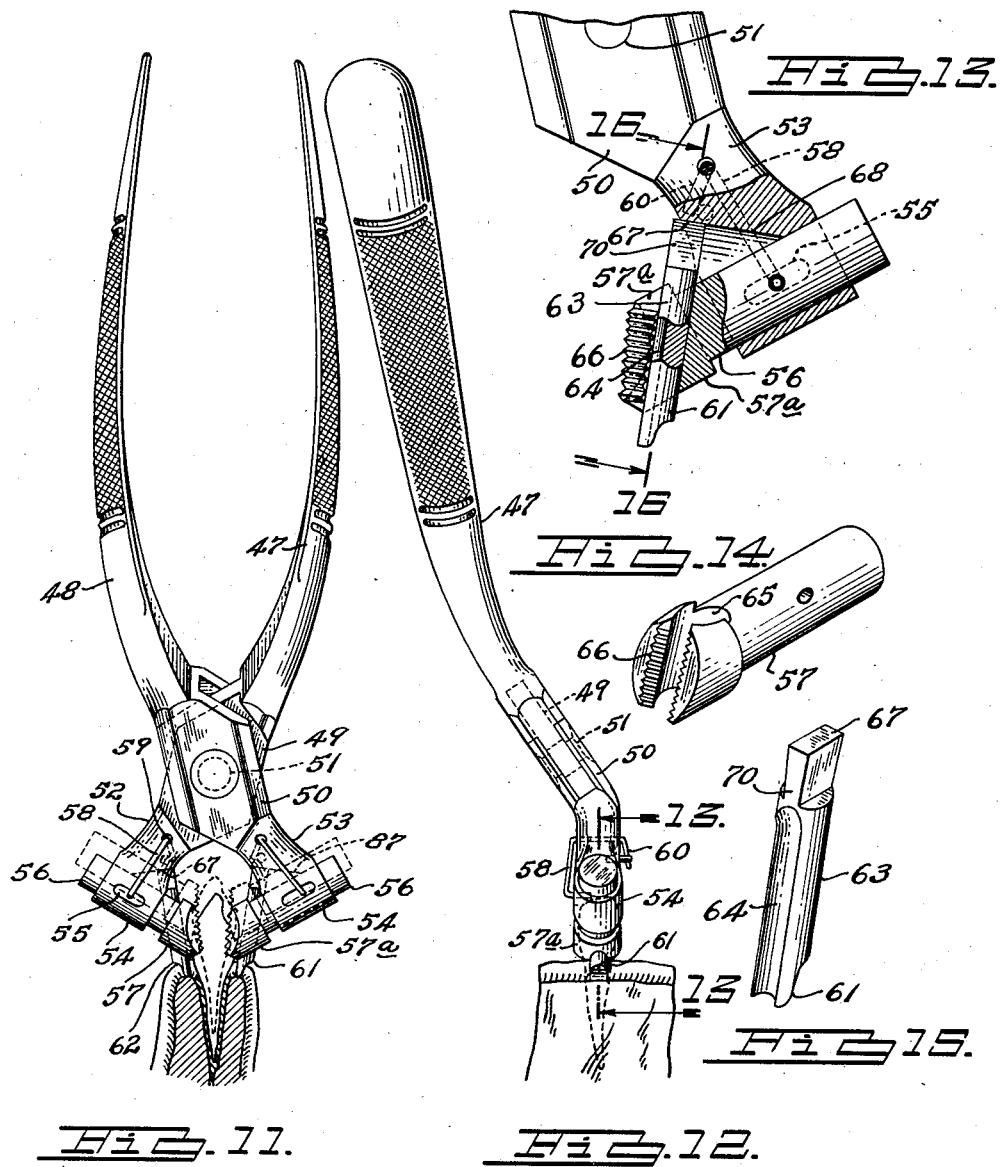

Patented Dec. 13, 1938

2,140,280

UNITED STATES PATENT OFFICE 2,140,280

DENTAL FORCEPS

Elmore E. Buskirk, Adrian, Mich.

Application June 24, 1937, Serial No. 150,056

9 Claims. (Cl. 32—62)

This invention relates to method of and means for extracting teeth involving the exerting of pressure upon the alveolar process in a direction opposite and equal to the force applied in extracting the tooth. The strains on the jaw therefore being in opposed relation, the dentist is able to extract the tooth not only much more readily and with less pain to the patient and muscular exertion on the part of the dentist but also avoids wrenching the jaw of the individual in the extraction operation and liability of fracture of the process is materially reduced.

A further feature and object of the invention is to provide forceps having a pair of opposed beaks engaging the process on opposite sides and adjacent the base of a tooth and a pair of similarly opposed beaks that grasp the tooth and by closing the beaks under pressure or by slight oscillation of the forceps transversely of the jaw, the tooth engaging beaks are moved away from the jaw thus extracting the tooth.

It is further a feature and object of the invention to provide a forceps in which the beaks engaging the tooth are stationarily fixed and the beaks engaging the process are caused to move thereagainst by pressure and/or the oscillating or rocking of the forceps transversely of the jaw.

More specifically, it is the purpose and object of the invention to provide a forceps or tooth extracting instrument having relatively movable tooth and process engaging parts so constructed and arranged that, by application of pressure to the tooth and/or oscillation of the instrument relative to the plane of the jaw pressure is applied to the process equal and opposite to the force required in withdrawing the tooth.

These and other objects and various novel features of a dental forceps embodying my invention in some of its possible forms is shown in the accompanying drawings in which—

Fig. 1 is an elevation of one form of forceps embodying my invention and showing the relationship of the beaks engaging the process and the beaks engaging the tooth in the extraction thereof.

Fig. 2 is a side view thereof.

Fig. 3 is an enlarged detail showing the construction of the beaks taken substantially on line 3—3 of Fig. 2.

Fig. 4 is a view taken from the left side of Fig. 3 with the beaks in the open position.

Fig. 5 is a perspective detail of the tooth engaging jaw.

Fig. 6 is a side elevation of another form of forceps embodying my invention shown as being applied to a tooth.

Fig. 7 is a plan view of Fig. 6.

Fig. 8 is an end elevation taken from the left side of Fig. 8 and showing the relatively stationary beaks engaging the process and the movable beaks engaging the tooth.

Fig. 9 is an enlarged section taken on line 9—9 of Fig. 8.

Fig. 10 is a detail of one of the beaks adapted to engage the tooth.

Fig. 11 is an elevation showing another form of the forceps in the position engaging a tooth for the extraction thereof.

Fig. 12 is a side elevation thereof.

Fig. 13 is an enlarged detail partly in section taken on line 13—13 of Fig. 12.

Fig. 14 is a detail in perspective of one of the tooth engaging beaks.

Fig. 15 is a detail in perspective of one of the beaks for engaging the process to apply pressure thereto in opposition to the force applied in the extraction of a tooth.

Fig. 16 is a section taken on line 16—16 of Fig. 13 showing the retaining groove and head of a process engaging beak in position therein.

In the form of forceps shown in Fig. 1, there is a pair of beaks pivoted together as by a pivot 5 after the manner of forceps or pliers whereby, in bringing the handle portions 1 and 2 toward each other, the opposite ends, illustrated generally at 3 and 4 in Fig. 1, are moved toward each other. Each of the lever arms are flattened adjacent the pivot to maintain the two beaks 6 and 7 at the ends of the arms 3 and 4 in properly opposed relationship at any point of movement of the handle elements.

The method of extracting the tooth is shown clearly in Fig. 1 and this consists in the provision of the beaks 6 and 7 integral with the respective arm ends 3 or 4 that are intended to engage the process and the tip end of these terminal portions 6 and 7 is somewhat rounded as indicated at 8a in Fig. 4. Lying between the arm ends 3 and 4 carrying the external beaks are provided interior beaks 8 and 9 which are illustrated in Fig. 5 as having a tooth engaging terminal end 10, a curved portion 11 and a rectangular portion 12 which has a longitudinal recess 13 in its outer end. Both these inner beaks 8 and 9 are alike in construction, and each of the arm ends 3 and 4 are constructed to provide a way 14 in which the respective beaks 8 and 9 may slide.

As shown in Fig. 1, the way 14 in which the rectangular portion of the beaks 8 or 9 fits lies at an angle to a line passing through the center of the tooth and axis 5 of the forceps and as each of the beaks are outside of this line and lie at the same angle to the tooth, the included angle is in the structure shown about twenty degrees but may be as great as forty degrees.

Each of the inner beaks 8 and 9 is provided with a spring 15 tending to move the same outwardly to engagement with the curved portion toward the end of the respective outer beak as will be more fully understood from Fig. 3. The beaks 8 and 9 are retained in place in the respective arm ends 3 and 4 by a plate 16 which may be secured in place as by a screw 17 and each of these plates has an inturned lug 18 providing a retainer against which the outer end of the spring 15 engages as shown more particularly in Figs. 1 and 3.

In the assembled instrument therefore, the companion inner and outer beaks are in what may be termed a "nested" relationship as indicated more clearly in the lower part of Fig. 3 and with the curved end 11 of the inner beak 9 engaging the curved face of the outer beak 7. The inner beak 8 and outer beak 6 are in the same relationship and when so assembled, the tooth engaging points 19 and 20 of each of the inner beaks project inwardly of the terminal end 8 of each of the outer beaks.

It will thus be seen that, by this arrangement, with the forceps applied to the tooth as in Fig. 1, the inner beaks engage the tooth and limit the extent to which the points 6 and 7 of the outer beaks may approach each other. This provides a structure in which the points of the outer beaks, which are somewhat curved as shown at the bottom lower end of Fig. 4, are out of contact with the tooth and in position to engage the alveolar process 21 as shown in Fig. 1. In this view, the gum is indicated at 22 and the peridental membrane is indicated at 23.

In the use of the instrument, the ends 8a of the curved portions 6 and 7 of the outer beaks are brought to engagement with the upper edge of the process on opposite sides of the tooth, the tip ends 19 and 20 of the inner beaks engaging correspondingly opposite sides of the tooth. The forceps should be presented on the gum and will cut into the same as pressure is applied to engagement with the edge of the process at the base of the tooth. With the forceps in this position and relationship with the tooth, the forceps is oscillated back and forth first in one direction and then the other as indicated by the arrows near the top of Fig. 1. With a firm grasp of the tooth by the inner beaks, rocking the same to the left of the position shown will exert force on the right hand side of the tooth and rocking in the opposite direction causes force to be applied by the beak portion 8 on the left side of the tooth but it is to be observed that this force tending to withdraw the tooth is opposed by the resultant pressure applied by the beaks 6 and 7 to the process.

Thus the inner beaks, by repeated oscillation, tend to move upwardly in the ways 14 provided therefor and against the tension of the springs 15 while the outer beaks 6 and 7 remain in position against the process and thus the tooth 24 is brought outwardly of the jaw as indicated by dotted lines in Fig. 1. The extent of oscillation from a line passing longitudinally through the tooth and pivot point 5 of the forceps is not great and therefore may be readily oscillated without the handle portions engaging the face of the patient and by this means the tooth is very readily withdrawn with less discomfort to the patient than by the old method of attempting to hold the jaw and head of the patient by hand while extracting pressure is applied to the tooth. It is further pointed out that the movement of the inner beaks 8 and 9 in respect to the outer beaks 6 and 7 is produced for the following reason:

In first turning the tool to the left from the position shown in Fig. 1, the tooth must give a little in its socket as the beak 9 is raised from the position shown. As the forceps are then rocked to the right, the left beak 8 tends to release and raise the tooth in its socket slightly but the position of the beak 9 in its way will be a little higher than its original position, depending upon the extent of oscillation. Repeated oscillations of the beaks therefore actually cause the inner beaks to move upwardly in the ways if the lower jaw is being operated but at all times to be supported at the respective right and left hand sides of the ways 14 due to the clamping pressure of the hand of the dentist upon the handles which maintains the beaks 8 and 9 seated against the outer faces of the ways which naturally are slightly larger than the shank 12 of the inner jaws to permit the same to slide readily therein.

My improved method of extracting teeth therefore is illustrated in Fig. 1 and consists essentially in the applying of pressure against the process in opposed relation to the force employed in withdrawing the tooth from the process, and it is by this method that the jaw is not necessarily required to be held manually nor is it necessary to wrench or forcibly twist the jaw in the act of withdrawing the tooth as has been the case heretofore.

It will be evident to those familiar with dental appliances, that my improved forceps may be made in the usual various forms as may be required by the particular tooth to be withdrawn.

The forceps shown in Fig. 1 are of the upper anterior and bicuspid type while that illustrated in Fig. 2 is of the lower anterior and bicuspid type.

In Fig. 6 is shown a form of dental forceps such as used on the lower anteriors. In this form the short ends of the arms form the two opposed beaks 26 and 27 at an angle to the handle elements 28 and 29 and these two handle parts are pivoted together as by the headed rivet 30 and are each provided with oppositely opposed flat surfaces 31 and 32 substantially as in the structure shown in Fig. 1. The two outer beaks 26 and 27 are semi-circular in form at the lower ends to receive the substantially cylindrical body 33 of the inner beaks 34 and 35. The side points of the outer beaks may engage between the teeth in any of the forms of my improved forceps.

The inner beaks have a serrated tooth engaging lower end 36 which is curved at 37 as shown in Fig. 10, or slightly angularly disposed as indicated by 37' in Fig. 8 in which the outer beak 26 is broken away to expose the inner beak. The inner beaks 34 and 35 ride in recesses 38 and 39 provided in the outer beaks 26 and 27. Each of the inner beaks 34 and 35 are provided on their outer faces with a pin 39' which rides in the slot 40 in the outer face of each of the outer beaks 26 and 27 and thus are held from rotation in their recesses in the outer beaks. The inner beaks 34 and 35 are held under pressure of the respective springs 41 and 42 which lie in crossed relation longitudinally of the arms and each have an end portion 43 and 44 extending through an aperture in the respective handles. Each spring 41 and 42 is thus supported by each handle and beak therefor and permit manipulation of the forceps in opening or closing the beaks. In clamping this device on a tooth 45, the terminal ends 36 of the inner beaks 34 and 35 engage the tooth while the terminal ends of the outer beaks 26 and 27 do not contact the tooth but, as is shown in Fig. 8, rest on the process. By oscillating the handles, the beak end 25 is rocked transversely of the line passing centrally through the tooth between the beaks and the force applied in withdrawing the tooth is counter-acted by the pressure applied to the process by the outer beaks and, under the oscillation of the head of the forceps, the tooth is first broken loose from the socket or process 46 shown in Fig. 8 and the inner beaks thus move upwardly in their respective and relatively angularly disposed slot in the outer beaks in the same manner as previously described in respect to the structure shown in Fig. 1, the method employed being substantially the same as in the structure shown in Fig. 1.

The structure shown in Figs. 6 to 10 inclusive differs from the structure shown in Figs. 1 to 5 and is illustrative of the fact that the details of the structure may differ materially without altering the function of the parts or change in method of extraction.

In the two structures so far described, the inner tooth engaging beaks move upwardly in the position of the parts shown in Figs. 1 or 8 while the outer beaks engage the process and remain in contact therewith during the extraction of the tooth. The same invention, however, may be involved in a structure in which the process engaging beaks ride in slots provided in the tooth engaging beaks which correspond more nearly in structural relation to the outer beaks of Fig. 1 or 8—that is, the relatively movable element engages the process and by oscillation of the handle will cause it to continually engage the process while the tooth engaging elements in which they ride move relatively thereto and extract the tooth. This again, as will be seen from the following, indicates the wide range of equivalent structures that may be utilized in a forceps by which my new and improved method of extracting teeth may be performed. Such divergent form of structure is shown in Figs. 11 to 15 inclusive and in Fig. 11 the crossed arms or handles of the forceps are indicated at 47 and 48 having the inter-engaging flat faces 49 and 50 secured together by the headed rivet 51. This is the same type of forceps indicated in Fig. 1 and each of the arms 47 and 48 have the short ends 52 and 53 respectively. These ends both terminate in similar cylindrical portions 54 having a slot 55 therein and slidably support the cylindrical shank 56 of the respective tooth engaging beak 57 and 57a.

A spring wire 58 is provided for each of the end portions 52 and 53, one end engaging in an aperture 59 and the other in an aperture provided therefor in the cylindrical shank 56 into which the spring end extends through the slot 55. These springs have terminal portions on the opposite side of the arm from that shown in Fig. 11 and as indicated at 60 in Fig. 12, the springs for each arm end 52 and 53 are tensioned to force the tooth engaging beaks relatively inwardly on the longitudinal axis of the shanks. In this structure, the process engaging beaks are indicated at 61 and 62, one of which is shown in the perspective view Fig. 15. Each inner beak has a body 63 of substantially cylindrical shape and formed with a groove 64 on the inner and opposing faces of the two beaks 61 and 62. This forms a terminal end that engages the process and out of contact with the tooth when the companion tooth engaging beaks 57 and 57a are in engagement with the tooth. Each of the beaks 57 and 57a has an angularly disposed aperture 65 which opens through the face of the tooth engaging end 66 of each of the said beaks as shown in perspective view Fig. 14. The outer end 67 of the process engaging beaks 61 and 62 is formed at a right angle to the longitudinal axis of the respective beaks and engages the bottom of a slot 68 in each of the arms 52 and 53, which slot, in the construction shown, opens into the aperture in which the shank 56 of each tooth engaging beaks 57 and 57a rides.

As shown in Fig. 16, the slot 68 is wider at the bottom than at the throat opening into the aperture for the shank 56 and the end 67 is of less width at 70 than at the terminal end. This form of groove and end 70 of the beaks 61 and 62 prevents the process beaks from moving longitudinally.

The springs 58 for each of the shanks 56 of the two tooth engaging beaks tend to move the same outwardly in their recesses and at a comparatively wide angle (40 to 65 degrees) relative to a line passing longitudinally through the tooth and axis of the forceps, while the two process engaging elements 61 and 62 lie at an angle one to the other of twenty to forty degrees, which angle may vary considerably without detriment in operation of the device.

It will be understood from the dotted line position of the element 57a and its shank 56 in Fig. 11 that, if the arms 52 and 53 be moved towards each other, the elements 56 in each arm will be relatively moved outwardly from its full line position, the end 67 of the beaks 61 and 62 will ride down the inclined bottom of the slot 68 and thus cause its lower end to be projected downwardly. It will therefore be understood, in reference to Fig. 11, that when the tooth engaging beaks 57 and 57a are brought to engagement with the tooth so that they may no longer move toward each other, the arms 52 and 53 will move down the shanks 56 thus moving the inclined bottom of the slot 68 across the upper ends of the process engaging elements 61 and 62 and forcing the same against the process or downwardly in the position of the parts here shown. Now, by oscillation of the handle parts as in the previous instances given, the tooth is first loosened on one side and then on the other while pressure is applied to the process and consequently the tooth engaging elements will move upwardly from the position shown and in this last described means for extraction of a tooth, pressure will be applied to the process in one direction equal to the force applied in the opposite direction to the tooth.

The structure disclosed in these Figs. 11 to 15 inclusive, while differing quite materially in form and arrangement, still functions exactly as the form shown in Figs. 1 to 10 inclusive and further makes evident the fact that the method of extraction and the general principle of operation of the dental forceps may be embodied in the various types of forceps required generally by the profession.

In the preceding description of the act of extracting a tooth by my improved method and means, it is stated that the forceps may be rocked slightly relative to the plane of the jaw. It is pointed out, however, that by arranging the tooth engaging beaks of the two forceps of Figs. 1 and 6 or arranging the process engaging beaks of Fig. 11 at an angle one to the other of twenty-eight to thirty-two degrees, the mere clamping of the forceps onto the tooth under pressure will cause the tooth to be extracted without necessity of rocking or oscillating the forceps. It is desirable, however, to slightly rock the forceps as such act separates the tooth gradually from the alveolar process or socket.

It is believed to be evident from the foregoing description, that various types of forceps, three of which are here shown, may be constructed to embody my invention; that the forceps is of great utility in that it is possible to extract teeth without twisting of the jaw of the patient or applying undue pressures or strains in the extracting of the teeth principally due to the fact of applying pressure in one direction on the jaw of the patient to counteract the force applied to the tooth which pressures or forces are in balance and thus not requiring either muscular effort on the part of the dentist or any excessive twisting of either the upper or the lower jaws to extract the teeth and further that the various features and objects of the invention are attained by each of the structures described, and that various changes in form and arrangement of the parts may be made without departing from the spirit and scope of the invention as set forth in the appended claims.

Having thus fully described my invention, its utility and mode of operation, what I claim and desire to secure by Letters Patent of the United States is—

1. In a dental forceps, a pair of pivoted handle elements, a pair of opposed tooth engaging beaks and a pair of similarly opposed process engaging beaks provided at one end of the handle elements, the tooth engaging beaks being normally positioned with the terminal ends a less distance from the pivotal point of the handle elements than the terminal ends of the process engaging beaks, one of the said pairs of beaks being slidable relative to the other by pressure applied to the handle elements and providing a construction whereby oscillation of the forceps transversely of a line passing longitudinally through the tooth and axis of the forceps while pressure is applied to the handle elements to grip the tooth by the tooth engaging beaks causes one pair of beaks to move relative to the other and thereby extract a tooth by applying pressure to the jaw in a direction opposed to the direction of application of force to the tooth.

2. In a dental forceps, a pair of pivoted handle elements, a pair of opposed tooth engaging beaks arranged at an angle to the general plane of the handle elements and a pair of similarly opposed process engaging beaks carried by said tooth engaging beaks, the process engaging beaks terminating a greater distance from the pivot point of the handle elements than the tooth engaging beaks, the said pairs of beaks being relatively slidable in a plane longitudinally of the beaks by application of pressure to the handle elements to grip the tooth by the tooth engaging beaks and providing a construction whereby oscillation of the beaks transversely of a line passing through the longitudinal axis of the tooth causes relative movement of the process and tooth engaging beaks to thereby apply pressure to the process in a direction opposite to the force applied in extracting the tooth.

3. In a dental forceps, a pair of pivoted handle elements, a pair of tooth engaging beaks respectively slidably supported at one end of each handle on one side of the pivot point, spring means for each of the said beaks tending to move the same relatively toward each other and the two beaks being relatively angularly disposed one to the other and providing a construction whereby, in pressing the said beaks to engagement with the tooth, the said handle ends may subsequently move relative to the beaks, a process engaging beak slidably supported in each of the tooth engaging beaks and projecting normally to a point therebelow, the said handle ends having a notch provided with a bottom extending approximately at a right angle to the longitudinal center line of the process engaging beak engaged by the base of the respective process beak, the process engaging beaks lying at an angle one to the other when positioned for use, the included angle therebetween being less than the included angle between the tooth engaging beaks and providing a construction whereby pressure applied in clamping the tooth engaging elements to the tooth causes the end of the forceps carrying the same to approach each other and thereby causing the process engaging beaks to move against the process by movement of the said bottom of the notch across the end of the process engaging elements.

4. In a dental forceps, a pair of pivoted elements having beak supporting portions on one side of the pivot, the said beak portions each having a recess, the longitudinal axis of which occupies a plane at a right angle to the axis of the pivot, the said recesses further being relatively angularly disposed, a pair of beaks each having opposed tooth engaging portions and a shank slidable in the recess of the said respective arm ends, spring means tending to project the beaks inwardly relative to each other, a second pair of beaks for engaging the process of the jaw, the tooth engaging beaks each having an aperture angularly disposed relative to the axis thereof in which the process engaging beaks are respectively slidable, the said aperture and process engaging beaks lying at a relative angle one to the other less than the included angle between the tooth engaging beaks, an undercut way in each of the beak supporting positions of greatest width at the bottom, each of the process engaging beaks having a base portion of similar cross section to the way and slidable therein, the said process engaging beaks and the way being disposed at a right angle one to the other and providing a construction that, when the tooth engaging beaks are brought to pressure engagement with the tooth, the supporting arms are moved longitudinally of the shanks of the beak whereby the process engaging beaks are relatively moved in the groove and caused to be moved longitudinally in the apertures therefor in the tooth engaging beaks to thereby apply pressure to the process and force the tooth engaging beaks away from the process and thereby extract the tooth.

5. A dental forceps comprising a pair of pivoted handle elements, a beak forming a terminal of each of the handle elements on one side of the pivotal point, a secondary beak slidingly supported by each of the first named beaks, the secondary beaks when positioned in engagement with a tooth lying at an angle one to the other of from thirty to forty-five degrees, spring means tending to move each of the secondary beaks outwardly of the pivot point and the outer beaks being recessed to provide an abutment limiting the extent of projection of the secondary beaks by their respective springs, the secondary beaks in projected position having their terminal ends relatively facing each other and spaced a less distance apart than the terminal ends of the outer beaks whereby, in placing the same on a tooth, the outer beaks are held from engagement therewith and in engagement with the process whereby said process provides a base supporting the forceps from movement while the inner beaks are caused to move and extracting a tooth due to oscillation of the forceps transversely of a plane passing through the tooth and pivotal axis of the handle elements.

6. A dental forceps comprising a pair of pivoted arms, the arms at one side of the pivot point being provided with a pair of process engaging beaks and a pair of tooth engaging beaks, the tooth engaging beaks being angularly disposed relative to the process engaging beaks and each pair of beaks being in opposed relation, the said tooth engaging beaks being slidable relative to the process engaging beaks and less in length than the process engaging beaks whereby, when the process engaging beaks are positioned in engagement with the process, the tooth engaging beaks are positioned to engage a tooth at a distance from the process whereby oscillation of the beaks transversely of the plane cutting the longitudinal axis of the tooth causes the tooth engaging beaks to move relative to the process engaging beaks and thereby apply pressure to the process in a direction opposed to the direction of application of force to the tooth to thereby extract the same.

7. In a dental forceps, a pair of pivoted handle elements, a tooth engaging beak and a process engaging beak associated with the end of each handle element on one side of the pivot point, the said tooth and process engaging beaks occupying substantially the same plane and positionable transversely of the jaw to respectively engage opposite sides of a tooth and the process adjacent thereto, the tooth engaging beaks being slidably supported relative to the process engaging beaks, and spring means for restricting movement of the tooth engaging beaks relative to the process engaging beaks.

8. In a dental forceps, a pair of pivoted handle elements and a pair of opposed beaks respectively forming terminals thereof, a second pair of beaks each respectively slidably mounted in the opposed inner faces of the first named beaks and supported thereby at an angle one to the other, the terminal ends of the second beaks being normally a less distance from the pivot point than the terminal ends of the first named beaks, the first named beaks when placed in engagement with the process of the jaw on opposite sides of the tooth transversely of the jaw being held from engagement with the tooth by the second beaks when clamped thereon by application of pressure to the handles, the arrangement providing a structure wherein, through pressure applied to the tooth by the second pair of beaks and the rocking of the forceps in a plane transversely of the jaw, the first named beaks act as a fulcrum and apply pressure to the process in a direction opposite to that applied to the tooth by the second beaks in the extraction thereof.

9. A dental forceps comprising a pair of pivoted handle elements, a pair of beaks each forming the terminals of a handle on one side of the pivot, and a pair of second beaks each respectively slidably supported by the first named beaks, the said second beaks lying at an angle one to the other within the range of 20 to 45 degrees when in position for withdrawal of a tooth, spring means tending to move the second beaks to position, the terminal ends of the second beaks a less distance apart than the terminal ends of the first beaks whereby when the forceps is positioned for use the process of the jaw is engaged by the first beaks and the second beaks engage the tooth and hold the first beaks from engagement therewith and by subsequent oscillation of the forceps transversely of the plane passing through the tooth and pivotal axis of the handle elements, force is applied by the second beaks to extract the tooth and opposing force is applied to the jaw by the process engaging beaks.

ELMORE E. BUSKIRK.